Aug. 22, 1967 — A. E. NEWTON — 3,337,093
ELECTRICALLY HEATED CEMENT EXTRUDERS
Original Filed April 6, 1964 — 2 Sheets-Sheet 1

Inventor
Albert E. Newton
By his Attorney

Aug. 22, 1967  A. E. NEWTON  3,337,093
ELECTRICALLY HEATED CEMENT EXTRUDERS
Original Filed April 6, 1964  2 Sheets-Sheet 2
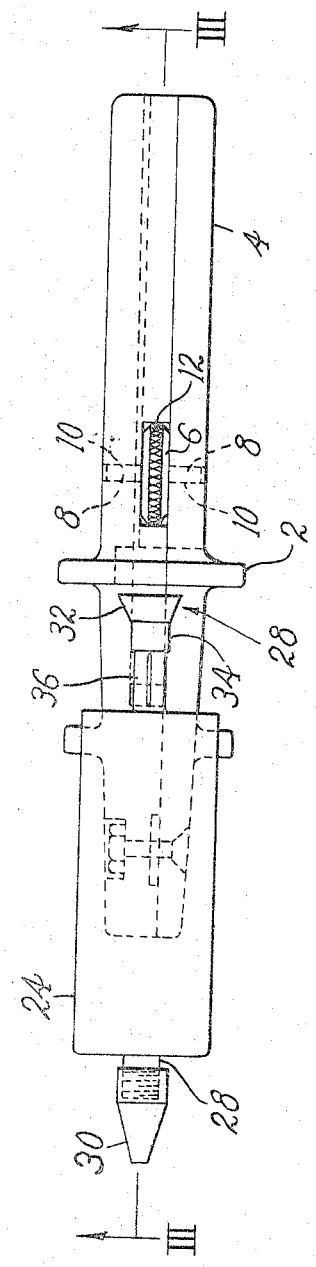
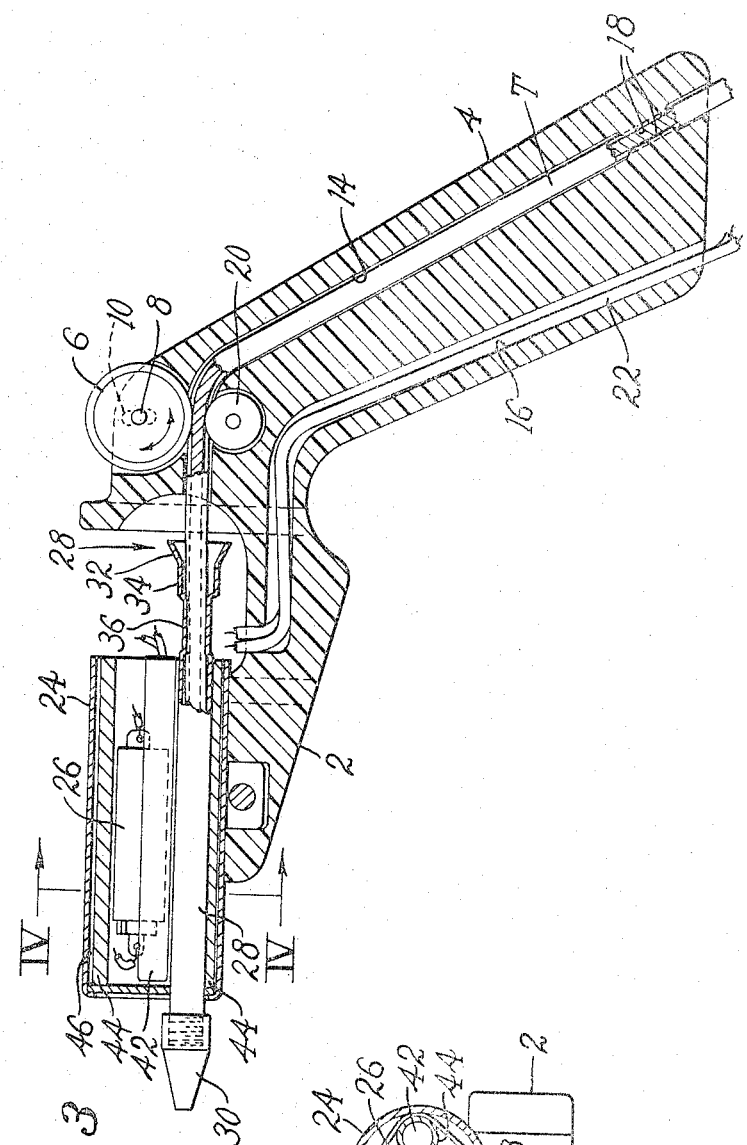
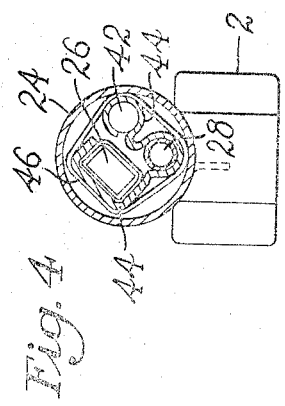

United States Patent Office 3,337,093
Patented Aug. 22, 1967

3,337,093
ELECTRICALLY HEATED CEMENT EXTRUDERS
Albert E. Newton, Beverly, Mass., assignor to United Shoe Machinery Corporation, Boston, Mass., a corporation of New Jersey
Original application Apr. 6, 1964, Ser. No. 357,439, now Patent No. 3,281,576, dated Oct. 25, 1966. Divided and this application Apr. 15, 1966, Ser. No. 542,836
1 Claim. (Cl. 222—146)

This is a division of application Ser. No. 357,439 filed Apr. 6, 1964, in the names of George H. Cooper and Albert E. Newton, now U.S. Patent No. 3,281,576.

The invention relates to cement extruders and more particularly to an improved, no-drip, hand-held thermoplastic extrusion device.

There are many instances in which it is desirable to apply a small quantity of quick setting cement to a piece of work as, for example, in closing a carton, in the manufacture of shoes, or in repairing furniture. Thermoplastic cements are very satisfactory for such work because of their quick setting properties and the strong bond which they afford. Tools for the application of thermoplastic cements often have a heatable barrel portion of cylindrical configuration aligned with a passage in the frame of the tool. Uusually the tools are so arranged that the temperature of a thermoplastic material disposed in the passage in the frame of the tool is maintained below the melting point of the thermoplastic, while the temperature of the barrel portion is raised to a point sufficient to insure melting of the thermoplastic disposed in that portion. A feed means is provided for urging the thermoplastic material from the passage in the frame to the heatable barrel portion, causing the melted material to be extruded from the barrel.

A problem in devices of this type, hand tools or otherwise, has been the "drool" or drippage of the melted thermoplastic from the barrel when the extruder is not being used, as when the device is laid aside between periods of use. If the heater element is not turned off immediately upon completion of a cementing operation, the thermoplastic in the barrel continues to melt and, even though the thermoplastic rod is no longer fed into the barrel, often drools out of the nozzle end.

Usually, in hand units, the only off-on devices are a thermostat which allows the heater element to furnish heat at a level suitable for melting of the thermoplastic, and the male plug for connecting the device to a source of electricity. The thermostat usually functions to allow the heater element to melt the thermoplastic and maintain it in a fluid state, susceptible to drool. Disconnecting the plug between frequent and intermittent uses is inconvenient and often impractical as a means of preventing cement drool. Consequently, there is frequently a steady drool from the nozzle portion when the tool is set aside. A simple off-on switch would be convenient but would, in the off position, allow the molten cement to completely harden, necessitating a "warm-up" period, or a waiting time sufficient to permit remelting of the hardened cement.

An object of the invention is to provide a low cost no-drip, hand held cement applying tool in which thermoplastic cement in convenient rod form can be easily and effectively used. A feature of the invention resides in an improved arrangement of the heater, thermostat and barrel member which effects a substantially instantaneous cessation in output of the heater element upon completion of each cementing operation. To this end, the device includes a thermal conductor means connecting seriatim the heating element to the barrel and the barrel to the thermostat, whereby substantially all the heat from the heating element is conducted to the barrel, and the heat from the barrel is conducted to the thermostat to control the heating element.

The above and other features of the invention including various novel details of construction and combinations of parts will now be more particularly described with reference to the accompanying drawings and pointed out in the claim. It will be understood that the particular device embodying the invention is shown by way of illustration only and not as a limitation of the invention. The principles and features of this invention may be employed in varied and numerous embodiments without departing from the scope of the invention.

In the drawings:

FIG. 2 is a plan view;

FIG. 3 is a section taken substantially along line III—III of FIG. 2, and

FIG. 4 is a section taken along line IV—IV of FIG. 3.

Figure 1:
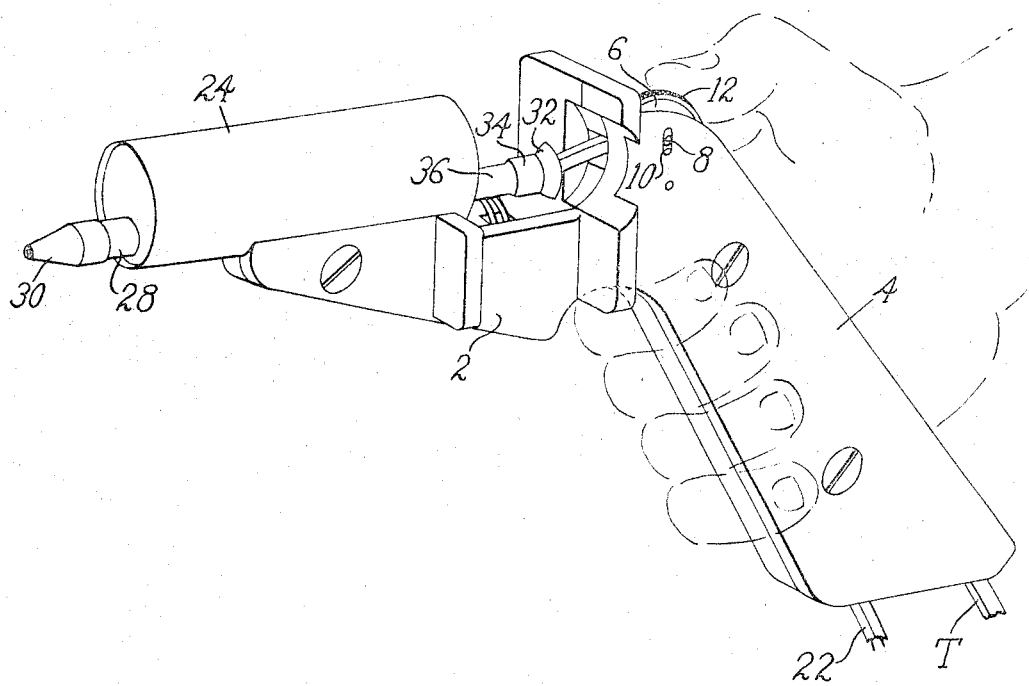
FIG. 1 is a perspective view showing one form of tool embodying the invention.

As illustrated in FIGS. 1–3, the device comprises a frame 2 including a grip portion 4. The grip 4 is adapted to retain a feed wheel 6 having an axle 8 which rides freely, rotatably and slidably, in a pair of slots 10 in the frame 2. The feed wheel 6 has formed about its periphery, as by knurling, a continuous set of teeth 12.

Channels 14 and 16 (FIG. 3) extend the length of the frame 2. The channel 14 contains a pair of guide vanes 18 for purposes described below. Disposed between the channels 14 and 16 and directly below the feed wheel 6 is a low friction roller 20.

The channel 14 is adapted to receive a thermoplastic material T in rod form, of the type disclosed in United States Letters Patent No. 2,874,084, granted Feb. 17, 1959. Such rod form has indentations of substantially V configuration on opposite sides of the rod. The teeth 12 of the feed wheel 6 may be shaped to engage one of the V portions of the thermoplastic rod T. If rod of another configuration is used, the periphery of the feed wheel 6 may be made complementary to the surface to be engaged. The periphery of the roller 20 is shaped to engage the opposite portion of the thermoplastic material. The guide vanes 18 are disposed within the channel 14 for engaging the V portions of the rod T, thereby causing the rod to approach the feed wheel 6 and the low friction roller 20 in the proper attitude. The channel 16 retains electrical leads 22 which are adapted for "plugging in" to an ordinary 110 volt A.C. household outlet. Attached to the forward portion of the frame 2 is a cylindrical housing 24 containing a thermostat 26 and a barrel member 28. The barrel member 28 may be made of copper or the like, and at its forward end is adapted to receive interchangeable nozzles 30. The nozzles may be provided with bayonet type fittings or threaded fittings to facilitate easy removal and replacement. The rearward end of the barrel 28 (that end toward the operator when the tool is in use) terminates in a flared portion 32 preceded by a leakage storage chamber 34, and separated from the frame 2 by an air gap. Just forward of the storage chamber 34 the barrel is necked down, as at 36. The necked down portion 36 of the barrel 28 has an interior configuration substantially complementary to the cross section of the rod T, or generally of a figure 8 design. Forward of the necked down portion 36 the barrel 28 is of cylindrical interior cross section.

Disposed in the housing 24 with the thermostat 26 and the barrel member 28 is a heating element 42. The leads 22 carry electrical current to the heating element 42, the heat output of which is controlled by the thermostat 26 as will be described hereinafter.

A heat conducting sheath 44 connects the heater element 42 with the barrel member 28 and the barrel member 28 with the thermostat 26. The sheath 44 extends substantially around the heater, the barrel, and the thermostat seriatim. The sheath 44 may be aluminum, or any suitable metal with good heat conductive characteristics. An asbestos envelope 46 may be used to enclose the heater, barrel and thermostat.

In operation, the leads 22 are connected to an ordinary household outlet. A nozzle 30 is chosen by the operator according to the task at hand. The nozzle selected by the operator is secured to the barrel 28 by a simple push and twist movement if a bayonet type joint is utilized, or by a screwing movement if a threaded joint is utilized.

The device is held in the hand, as shown in FIG. 1, with the palm and fingers of the hand disposed about the grip portion 4 of the frame member 2. The thumb of the hand is positioned on the feed wheel 6. A thermoplastic rod T, inserted in the channel 14, is heated by the heating element 42 in the housing 24 by current through the lead wires 22 disposed in the channel 16. Heating of the thermoplastic material transforms the material in the barrel 28 from a rod form into a fluid prior to its reaching the nozzle 30, which fluid is easily capable of flow throuh the nozzle.

As additional thermoplastic material is required, the operator depresses the feed wheel 6 and at the same time "thumbs" the feed wheel toward himself a number of degrees proportional to the additional amount of thermoplastic desired. The feed wheel 6 is thereby caused to move downwards in the slots 10 and in a clockwise direction upon the axle 8, as viewed in FIG. 3. The periphery of the feed wheel engages the surface of the thermoplastic rod T and urges it toward the barrel 28, thereby presenting fresh material to the heating element 42 and also exerting pressure upon the fluid material in the barrel 28 and the nozzle 30 so as to cause it to extrude from the nozzle 30. The roller 20 presents a low-friction surface which engages the side of the cement rod opposite the feed wheel 6 (FIG. 3) and supports the cement opposite the area where pressure is applied by the feed wheel 6.

As long as thermoplastic material is flowing through the barrel 28, the heat emitted from the heating element 42 and directed toward the barrel, is for the most part carried with the moving cement out of the nozzle. The heating element 42 is connected by the sheath 44 to the barrel 28 to facilitate the transfer of substantially all of the heat from the heating element to the barrel. The air gap between the rearward end of the barrel 28 and the frame member 2 minimizes transfer of heat from the barrel into the channel 14 where it is desirable to keep the cement in rod form.

When the cementing operation is interrupted and the tool is set aside, some unique features of the tool act to prevent the drool and drippage generally associated with devices of this type. Upon completion of a particular cementing task, the operator reverses slightly the travel of the cement. It will be appreciated that the feed wheel 6 is freely reversible. By a slight turning of the feed wheel in a counterclockwise direction, as viewed in FIG. 3, the rod T is urged toward the operator. Withdrawal of the rod rearwardly creates a suction in the barrel 28 which pulls rearwardly the fluid cement in the nozzle area. When there is substantially no movement of cement through the barrel 28, the cement, instead of carrying away the heat of the heating element 42, cooperates with the sheath member 44 to conduct heat to the thermostat 26. The thermostat, upon sensing a rise in temperature, shuts off the heating element, so that melting of the thermoplastic rod ceases and that which is already molten becomes more viscous by cooling. Without a source of heat the nozzle 30, exposed to the air, cools very quickly allowing the cement therein to become particularly viscous without a propensity for drooling from the nozzle. In practice, it has been found to be satisfactory to have the thermostat shut off the heater when the thermostat senses a temperature of 330° F. and to restart the heater when the thermostat temperature is 320° F. Thus, the molten cement is retained in the fluid state but upon cooling becomes more viscous and therefore less inclined to drool. This is particularly so in the nozzle where its temperature drops to about 250° F. when cement is not being pushed through.

Fluid cement seeping rearwardly is restricted for the most part by the interior configuration of the neckeddown portion of the barrel 36. This portion, besides restricting flow, is exposed to the air for rapid cooling of the cement, thus lowering its propensity for further rearward flow. However, that seepage which does get through the restricted and air cooled portion 36 enters the drippage storage chamber 34 which has increased cooling surface and space for the accumulation of cement. In the event cement travels further rearward in the fluid state, it would come to the flared portion of the barrel 32 which affords still greater cooling area and exposure to the air. Thus, the tool may be set aside temporarily without danger to the surface on which it is laid. This is deemed especially beneficial in tools for household use.

When the cementing operation is resumed, the cement, although viscous, is sufficiently fluid to flow easily when pressure is applied from the feeding means. The flow of cement again carries most of the heat from the heater out the nozzle. The thermostat, not sensing its upper temperature setting, allows the heater to continue operation. The cement in absorbing the heat becomes less viscous and flows easily. The drippage collected in the storage area 34 and the flared portion 32 is carried back into the barrel in the form of a film adhering to the moving rod T. Any cement which may have reached the flared portion 32 and which has hardened is readily melted by heat conducted along the barrel portion 36.

Having thus described my invention, what I claim as new and desire to secure by Letters Patent of the United States is:

A device for applying thermoplastic adhesive comprising a frame, a barrel mounted on said frame, said barrel having an inlet for receiving a thermoplastic rod and an outlet for dispensing molten thermoplastic, means mounted on said frame for moving said thermoplastic rod into said inlet, an electrical heating element mounted on said frame for heating the barrel and melting the thermoplastic therein, a thermostat mounted on said frame for controlling the heating element, a heat conducing sheath connecting seriatim said heating element to said barrel and said barrel to said thermostat, said sheath extending substantially around the heating element and the barrel and the thermostat seriatim, whereby substantially all of the heat from the heating element is conducted through said sheath to said barrel and whereby, when the molten thermoplastic is being moved responsive to said rod moving means substantially all the heat conducted to said barrel is carried out said outlet with said molten thermoplastic, and whereby when the molten thermoplastic is stationary in said barrel the heat conducted to said barrel is further conducted through said barrel and through said sheath to the thermostat, the thermostat being responsive to the heat conducted from the barrel to control the heating element, the arrangement of the heating element, the barrel, the thermostat and the sheath being such that substantially no heat is conducted directly to the thermostat from the heating element.

References Cited

UNITED STATES PATENTS

| 1,906,225 | 5/1933 | Dupau | 228—53 |
| 2,233,558 | 3/1941 | Shaw. | |
| 2,247,816 | 7/1941 | McIlrath | 219—303 X |
| 2,288,248 | 6/1942 | Long. | |
| 2,982,841 | 5/1961 | MacCracken | 219—304 X |
| 2,995,159 | 8/1961 | Berggren. | |
| 3,221,937 | 12/1965 | Kambourian. | |

ROBERT B. REEVES, *Primary Examiner.*

F. R. HANDREN, *Assistant Examiner.*